United States Patent [19]

Nakashima et al.

[11] Patent Number: 4,688,984
[45] Date of Patent: Aug. 25, 1987

[54] WRIST DRIVING MECHANISM FOR INDUSTRIAL ROBOT

[75] Inventors: Seiichiro Nakashima; Kenichi Toyoda, both of Hino; Ryo Nihei, Musashino; Hitoshi Mizuno, Hino, all of Japan

[73] Assignee: Fanuc Ltd., Yamanashi, Japan

[21] Appl. No.: 767,583

[22] PCT Filed: Dec. 14, 1984

[86] PCT No.: PCT/JP84/00595
§ 371 Date: Aug. 13, 1985
§ 102(e) Date: Aug. 13, 1985

[87] PCT Pub. No.: WO85/02576
PCT Pub. Date: Jun. 20, 1985

[30] Foreign Application Priority Data

Dec. 14, 1983 [JP] Japan ................. 58-234161

[51] Int. Cl.⁴ .............................. B25J 17/02
[52] U.S. Cl. .................. 414/735; 74/665 C; 901/26; 901/29
[58] Field of Search ........ 414/735; 901/26, 28, 901/29; 74/640, 665 C, 665 R

[56] References Cited

U.S. PATENT DOCUMENTS

| | | | |
|---|---|---|---|
| 4,496,278 | 1/1985 | Kaise | 414/735 |
| 4,507,046 | 3/1985 | Sugimoto et al. | 901/29 X |
| 4,545,263 | 10/1985 | Fickelscher | 74/640 |
| 4,586,868 | 5/1986 | Nakashima et al. | 901/29 X |

FOREIGN PATENT DOCUMENTS 54-8870 6/1979 Japan.
54-42145 12/1979 Japan.
58-8466 2/1983 Japan.

Primary Examiner—Robert J. Spar
Assistant Examiner—Donald W. Underwood
Attorney, Agent, or Firm—Armstrong, Nikaido, Marmelstein & Kubovcik

[57] ABSTRACT

A wrist driving mechanism for an industrial robot has a first base wrist unit (13) supported on the free end of a robot arm (11) and capable of rotating about a first axis ($\gamma$). The first base wrist unit (13) is mounted with a second base wrist unit (14) capable of rotating about a second axis ($\beta$). The second base wrist unit (14) is mounted with a fore wrist unit (15) capable of rotating about a third axis ($\alpha$). The robot arm (11) is provided along the longitudinal direction thereof with a first power transmitting unit (16) for transmitting a rotative power to the first base wrist unit (13). A second power transmitting unit (19) for transmitting a rotative power to the second base wrist unit (14) is formed along the robot arm (11) and the first base wrist unit (13). A motor (25) for driving the fore wrist unit (15) for rotation is mounted on the first base wrist unit (13). The driving shaft of the motor (25) is coupled with a first transmission shaft (26) extended along the second axis ($\beta$). The first transmission shaft (26) is connected through a gear train (27) to the second transmission shaft (28) extended along the third axis ($\alpha$) and the second transmission shaft (28) is connected to the fore wrist unit (15). The second transmission shaft (28) is associated with a reduction gear mechanism (31).

5 Claims, 6 Drawing Figures

WRIST DRIVING MECHANISM FOR INDUSTRIAL ROBOT

DESCRIPTION

1. Technical Field

The present invention relates to a wrist driving mechanism for an industrial robot, and more specifically, to a wrist driving mechanism for driving the fore wrist unit of an industrial robot for rotary motion about three axes.

2. Background Art

There has been proposed a three-axis wrist driving mechanism including three power transmitting chains extended in parallel to each other along the robot arm to drive the fore wrist of the wrist device of an industrial robot for rotary motion about three axes. Such a conventional three-axis wrist driving mechanism is shown in FIG. 1. As shown in FIG. 1, a first base wrist unit 2 is joined to the free end of a robot arm 1 so as to be rotatable about an axis $\gamma$. A second base wrist unit 3 is joined to the first base wrist unit 2 so as to be rotatable about an axis $\alpha$. A fore wrist unit 4 is joined to the second base wrist unit 3 so as to be rotatable about an axis $\alpha$. Three sprockets 8, 9, and 10 are disposed rotatably within the free end of the robot arm 1. The sprockets 8, 9, and 10 are interlocked with the first base wrist unit 2, the second base wrist unit 3, and the fore wrist unit 4 respectively. Three chains 5, 6, and 7 are extended in parallel to each other within and along the longitudinal direction of the arm 1. The chains 5, 6, and 7 interconnect the sprockets 8, 9, and 10 and three corresponding driving sprockets, not shown, disposed side by side at the base end of the arm 1. The driving sprockets are connected through reduction gear mechanisms to driving motors, respectively. Ordinarily, functional equipment, such as a robot hand, a welding gun or a spray gun, is mounted on the fore wrist unit 4.

The rigidities of the output system about the axes $\alpha$, $\beta$ and $\gamma$ of a three axis wrist driving mechanism of the above-mentioned constitution are dependent on the spring constants k (k are fixed values) of the chains 5, 6, and 7. Particularly, when a torque about the axis $\beta$ is applied to the second base wrist unit 3, the first base wrist unit 2 tends to be turned about the axis $\gamma$. Therefore, the rigidity of the output system about the axis $\beta$ is dependent on the spring constants of the two chains 5 and 6. That is, the total spring constant $k\beta$ of the output system about the axis $\beta$ is expressed by an expression: $k\beta = k/2$.

When a torque about the axis $\alpha$ is applied to the fore wrist unit 4, the second base wrist unit 3 tends to be turned about the axis $\beta$, and hence the first base wrist unit 2 also tends to be turned about the axis $\gamma$. Accordingly, the rigidity of the output system about the axis $\alpha$ is dependent on the spring constants of the three chains 5, 6, and 7. Consequently, the total spring constant $k\alpha$ of the output system about the axis $\alpha$ is expressed by an expression $k\alpha = k/3$.

Accordingly, for the output system about the axis $\alpha$, the total spring constant is $k/3$ and the actual rigidity of the output system is one-third of the inherent rigidity thereof, even if chains of spring constant k are employed. Furthermore, since the spring constant k of a chain is in inverse proportion to the length of the chain, the rigidity of the output system about the axis $\alpha$ is reduced with the length of the chains.

In the above-mentioned wrist driving mechanism, a rotative motion of a reduced speed controlled by the reduction gear mechanism is transmitted through a gear train to the fore wrist unit. Therefore, backlash between the teeth of the gears reduces the rigidity of the output system.

DISCLOSURE OF THE INVENTION

Accordingly, in view of the disadvantages of the above-mentioned three-axis wrist driving mechanism of the chain-drive type, it is an object of the present invention to provide a wrist driving mechanism for an industrial robot, capable of enhancing the rigidity of the fore wrist unit of the three-axis wrist device about the axes of rotation thereof.

The present invention provides a wrist driving mechanism for an industrial robot, comprising: a first base wrist unit supported on the free end of a robot arm so as to be rotatable about a first axis relative to the robot arm; a second base wrist unit supported on the first base wrist unit so as to be rotatable about a second axis relative to the first base wrist unit; a fore wrist unit supported on the second base wrist unit so as to be rotatable about a third axis relative to the second base wrist unit; a first power transmitting unit disposed along the longitudinal direction of the robot arm to transmit a rotative power to the first base wrist unit; a second power transmitting unit disposed along the robot arm and the first base wrist unit to transmit a rotative power to the second base wrist unit; a motor mounted on the first base wrist unit to drive the fore wrist unit for rotation; a first transmission shaft coupled with the driving shaft of the motor and extended along the second axis; a second transmission shaft connected to the fore wrist unit, interlocked through a gear train with the first transmission shaft and extended along the third axis; and a reduction gear mechanism associated with the second transmission shaft.

According to the present invention, the power transmission system interlocking the fore wrist unit with the motor mounted on the first base wrist unit comprises the first transmission shaft, the gear train, the second transmission shaft and the reduction gear mechanism, therefore, the spring constant of the power transmission system interlocking the fore wrist unit with the motor is extremely large as compared with that of a power transmission system of the chain-drive type. Particularly, since the reduction gear mechanism is interposed between the output side of the gear train for transmitting the driving force of the motor and the fore wrist unit, backlash between the teeth of the gears of the gear train and the torsion of the transmission shafts scarcely affect the rigidity of the fore wrist unit. Thus the present invention is capable of providing a wrist driving mechanism which ensures a fore wrist having a high rigidity.

BRIEF DESCRIPTION OF THE DRAWINGS

These and other objects and features of the present invention will become more apparent from the following description taken in conjunction with the accompanying drawings, in which.

BEST MODE FOR CARRYING OUT THE INVENTION

Figure 1:
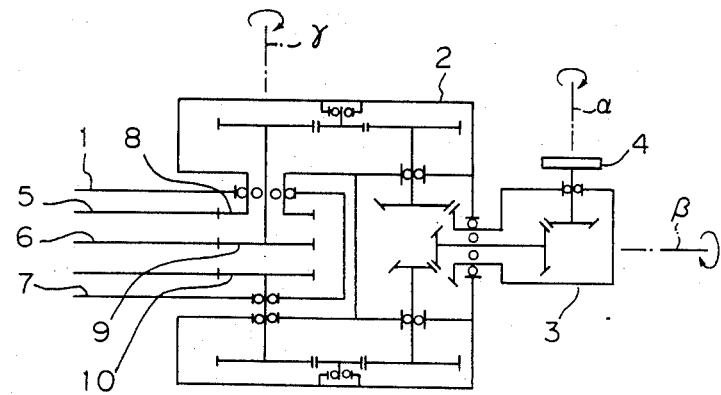
FIG. 1 is a schematic illustration of a three-axes wrist driving mechanisms of a conventional industrial robot.
Figure 2:
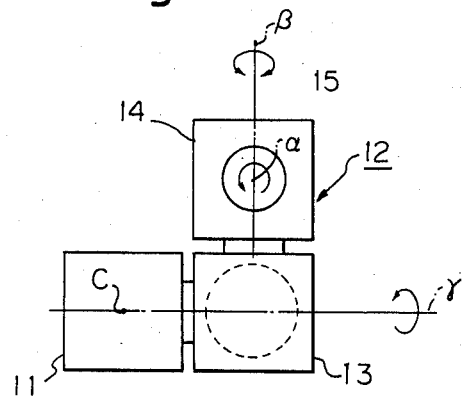
FIG. 2 is a front elevation of a wrist driving mechanism, in a preferred embodiment, according to the present invention, for an industrial robot.
Figure 3:
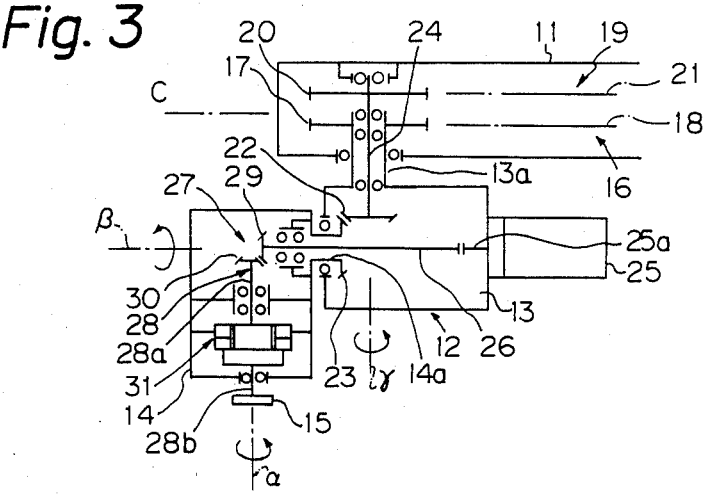
FIG. 3 is a schematic illustration showing the constitution of the wrist driving mechanism of FIG. 2.

FIGS. 2 to 5 show a preferred embodiment of the present invention. Referring to FIGS. 2 and 3, an industrial robot is provided with a wrist device 12 capable of rotary motion about three axes, mounted on the free end of a robot arm 11, and the wrist device comprises a first base wrist unit 13, a second base wrist unit 14 and a fore wrist unit 15.

The first base wrist unit 13 is supported so as to be rotatable about a first axis γ relative to the free end of the robot arm 11. The second base wrist unit 14 is supported so as to be rotatable about a second axis β relative to the first base wrist unit 13. The fore wrist unit 15 is supported so as to be rotatable about a third axis α relative to the second base wrist unit 14. The axis γ extends perpendicularly to the longitudinal axis C of the robot arm 11, while the axis α extends perpendicularly to the axis β.

The industrial robot is provided with a first power transmitting unit 16 for transmitting power to the first base wrist unit 13. The unit 16 comprises a first driven sprocket 17 rotatable about the axis γ and a first endless chain 18 as a wrapping connector for transmitting a rotative power to the sprocket 17. The sprocket 17 is fixed to the hollow shaft 13a of the first base wrist unit 13 so that the sprocket 17 is rotatable within the free end of the robot arm 11. The chain 18 is extended along the longitudinal axis C of the robot arm 11. The unit 16 includes a first driving sprocket, not shown, disposed at the base end of the robot arm 11, for driving the chain 18. The first driving sprocket is connected through a reduction gear mechanism, not shown, to a first driving motor, not shown.

The industrial robot is provided with a second power transmitting unit 19 for transmitting power to the second base wrist unit 14. The unit 19 comprises a second driven sprocket 20 disposed within the free end of the robot arm so as to be rotatable, a second endless chain 21 as a wrapping connector for transmitting a rotative power to the sprocket 20, and a pair of bevel gears 22 and 23 for transmitting the rotary motion of the sprocket 20 to the second base wrist unit 14. The input bevel gear 22 is fixed through a shaft 24 extending coaxially with the hollow shaft 13a of the first base wrist unit 13 to the sprocket 20 so as to be rotatable about the axis γ relative to the first base wrist unit 13. The output bevel gear 23 is fixed to the hollow shaft 14a of the second base wrist unit 14 for rotation about the axis β relative to the first base wrist unit 13. The second endless chain 21 is extended along the longitudinal axis C of the robot arm 11 in parallel to the first endless chain 18. The unit 19 further includes a second driving sprocket, not shown, for driving the chain 21, disposed at the base end of the robot arm 11. The second driving sprocket is connected through a reduction gear mechanism, not shown, to a second driving motor, not shown.

The first base wrist unit 13 is provided with a motor 25 to drive the fore wrist unit 15 for rotation. The driving shaft 25a of the motor 25 is coupled with a first transmission shaft 26 extended through the hollow shaft 14a of the second base wrist unit 14 along the axis β. The first transmission shaft 26 is interlocked with a second transmission shaft 28 by a gear train 27. The second transmission shaft 28 is extended along the axis α and is connected to the fore wrist unit 15. The gear train 27 consists of a pair of bevel gears 29 and 30.

Figure 4:
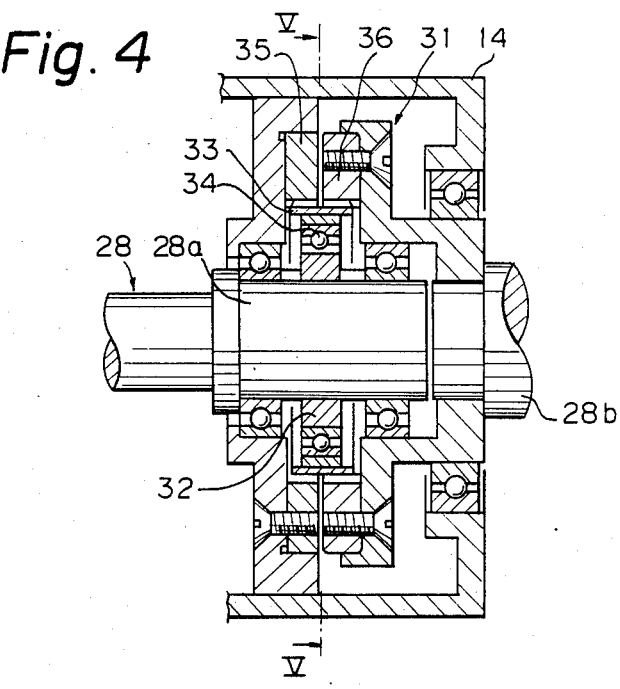
FIG. 4 is an enlarged longitudinal sectional view of the essential portion of the wrist driving mechanism of FIG. 2.
Figure 5:
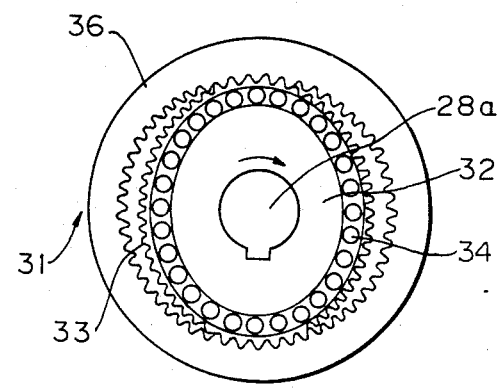
FIG. 5 is a sectional view of the wrist driving mechanism of FIG. 2 taken on line V—V of FIG. 4.

A reduction gear mechanism 31 is interposed in the second transmission shaft 28. In this embodiment, the second transmission shaft 28 has an input shaft 28a connected to the output bevel gear 30 of the gear train 27 and an output shaft 28b connected to the fore wrist unit 15. Referring to FIGS. 4 and 5, the reduction gear mechanism 31 has an elliptic inner member 32 fixed to the input shaft 28a. An elastic ring gear 33 having teeth formed along the outer circumference thereof is mounted through a bearing 34 on the circumference of the inner member 32 so as to be movable in the circumferential direction thereof. A first outer member 35 having teeth which engage the teeth of the ring gear 33 is fixed to the inner surface of the second base wrist unit 14. A second outer member 36 internally provided with teeth which engage the teeth of the ring gear 33 is fixed to the output shaft 28b. The reduction gear mechanism of this constitution is advantageous, as compared with an ordinary planetary gear mechanism, in that the play of the output side relative to the input side attributable to the backlash can be remarkably reduced. When the reduction ratio of this reduction gear mechanism 31 is desired to be 1/100, the numbers of teeth of the ring gear 33, the first outer member 35 and the second outer member 36 are, for example, 100, 101, and 101, respectively.

In this wrist driving mechanism according to the present invention, driving the first driven sprocket 17 by the first chain 18 causes the first base wrist unit 13 to rotate together with the first driven sprocket 17 about the axis γ, and driving the second driven sprocket 20 by the second chain 21 causes the input bevel gear 22 to rotate about the axis γ, so that the output bevel gear 23 engaging the input bevel gear 22 rotates together with the second base wrist unit 14 about the axis β.

On the other hand, when the motor 25 is actuated and the driving shaft 25a of the motor 25 rotates, the input bevel gear 29 rotates about the axis β, and thereby the output bevel gear 30 rotates together with the input shaft 28a about the axis α. The rotary motion of the input shaft 28a is transmitted through the reduction gear mechanism 31 to the output shaft 28b, in which the revolving speed of the input shaft 28a is reduced to a lower revolving speed of the output shaft 28b so that the output shaft 28a rotates together with the fore wrist unit 15 about the axis α.

A torque applied to the second base wrist unit 14 tends to turn the first base wrist unit 13. Therefore, the total spring constant kβ of the output system about the axis β, as viewed from the output side, is expressed by an expression: $k\beta = k/2$, where k is the spring constant of the first chain 18 and the second chain 21.

On the other hand, in the wrist driving mechanism according to the present invention, the power transmitting system interlocking the motor 25 with the fore wrist unit 15 comprises the first transmission shaft 26, the gear train 27, the second transmission shaft 28, and the reduction gear mechanism 31. Accordingly, the spring constant of the power transmitting system interconnecting the motor and the fore wrist unit is extremely large as compared with that of the conventional chaindriven driving system. Particularly, since the reduction gear mechanism is interposed between the output side of the gear train 27 for transmitting the driving force of the motor 25 and the fore wrist unit 15, backlash in the gear train 27 and the torsion of the first transmission shaft 26 interconnecting the motor 25 and the gear train 27 scarcely affect the rigidity of the fore wrist unit 15. Consequently, the rigidity of the fore wrist unit 15 is enhanced.

Figure 6:
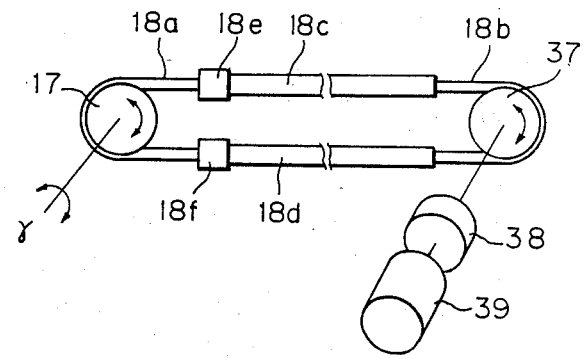
FIG. 6 is a fragmentary perspective view of a partial modification of the wrist driving mechanism of FIG. 2.

This embodiment employs the endless chains 18 and 21 as wrapping connectors for transmitting rotative power to the first driven sprocket 17 and to the second driven sprocket 20, respectively. However, the wrapping connector of the first power transmitting unit 16 may comprise a chain 18a of a predetermined length engaging the first driven sprocket 17, a chain 18b of a predetermined length engaging the first driving sprocket 37, and two parallel rods 18c and 18d interconnecting the respective opposite ends of the chains 18a, and 18b as shown in FIG. 6. Preferably, tighteners 18e and 18f are interposed between the rods 18c and 18d and either the chain 18a or the chain 18b. The first driving sprocket 37 is connected through a reduction gear mechanism 38 to the driving motor 39. Although not illustrated, the wrapping connector of the second power transmitting unit 19 may be constructed similarly to that of the first power transmitting unit 16. Since the length of the chains of such a wrapping connector employing rods can be shortened, the spring constant of the wrapping connector can be enhanced, whereby the respective rigidities of the output systems of the wrist mechanism are enhanced. When wrapping connectors of such a constitution are employed, it is desirable to reduce the lengths of the chains to the minimum possible lengths necessary for ensuring the action of the first and second base wrist units in the respective working ranges. Such a constitution restricts the reduction of the rigidity attributable to the elasticity of the wrapping connectors to a least extent.

The reduction gear mechanism 31 may be a reduction gear of another type such as a cycloreduction gear.

CAPABILITY OF EXPLOITATION IN INDUSTRY

A wrist driving mechanism for an industrial robot, according to the present invention is effectively applicable to articulated industrial robots for various work such as assembling, welding, and painting.

We claim:

1. A wrist driving mechanism for an industrial robot, comprising:
    an elongated robot arm having a free end;
    a first base wrist unit extending laterally from one side of said free end of said robot arm and rotatably supported about a first axis which intersects a longitudinal axis of said robot arm at a right angle;
    a second base wrist unit rotatably supported on said first base wrist unit about a second axis which intersects said first axis at a right angle;
    a fore wrist unit rotatably supported on said second base wrist unit about a third axis which intersects said second axis at a right angle, said fore wrist unit being adapted to enable functional equipment to be mounted thereon;
    a first power transmitting unit for transmitting a rotative power of a first drive motor provided on said robot arm to said first wrist base unit;
    a second power transmitting unit for transmitting a rotative power of a second drive motor provided on said robot arm to said second base wrist unit;
    a third drive and rotating said fore wrist unit about said third axis, said third drive motor having a drive shaft arranged coaxially with said second axis;
    first and second bevel gears meshing with each other within said second base wrist unit, and first bevel gear, coaxial with said second axis, is fixedly connected to said drive shaft of said third drive motor through a first transmission shaft extending coaxially with said second axis, and said second bevel gear is coaxial with said third axis; and
    a reduction gear unit supported on said fore wrist unit and having input and output shafts which extend coaxially with said third axis, said input shaft being fixed to said second bevel gear and said output shaft being fixed to said fore wrist unit.

2. The wrist driving mechanism of claim 1 wherein said reduction gear unit further comprises:
    an inner member fixed to said input shaft and having an elliptical outer circumferential surface;
    an elastic ring gear movably supported on said elliptical outer circumferential surface of said inner member and having outer teeth formed along the outer circumference thereof;
    a first outer member fixed to said second base wrist unit and having first inner teeth formed along the inner circumference thereof so as to mesh with said outer teeth of said ring gear; and
    a second outer member fixed to said output shaft and having second inner teeth formed along the inner circumference thereof so as to mesh with said outer teeth of said ring gear.

3. The wrist driving mechanism of claim 1 wherein, said first power transmitting unit includes a first sprocket rotatably supported on said robot arm about said first axis and fixed to said first base wrist unit, and a first wrapping connector engaged with said first sprocket to transmit rotation of said drive shaft of said first drive motor, and
    said second power transmitting unit includes a second sprocket rotatably supported on said robot arm about said first axis, and a second wrapping connector engaged with said second sprocket to transmit rotation of said drive shaft of said second drive motor, a third and fourth bevel gears meshing with each other within said first base wrist unit, said third bevel gear being arranged about said first axis and fixedly connected to said second sprocket through a second transmission shaft passing through said first sprocket, said fourth bevel gear being arranged about said second axis and fixed to said second base wrist unit, said first transmission shaft passing through said fourth bevel gear.

4. The wrist dirving mechanism of claim 3, wherein said first wrapping connector includes a pair of chains and a pair of parallel rods connecting opposite ends of one of said chains to opposite ends of the other said chain, and the respective lengths of said chains of said first wrapping connector are a minimum possible length necessary for ensuring action of said first base wrist unit in said working ranges.

5. The wrist driving mechanism of claim 3, wherein said second wrapping connector includes a pair of chains and a pair of parallel rods connecting opposite ends of one of said chains to opposite ends of the other said chain, and the respective lengths of said chains of said second wrapping connector are the minimum possible length necessary for ensuring action of said second base wrist unit in said working ranges.

* * * * *